(12) United States Patent
Bruntner

(10) Patent No.: US 8,052,357 B2
(45) Date of Patent: Nov. 8, 2011

(54) DEVICE FOR REMOVING BY SUCTION DRILL DUST WHEN DRILLING HOLES INTO WALLS

(75) Inventor: Eugen Bruntner, Schlierbach (DE)

(73) Assignee: Electrostar Schöttle GmbH & Co. KG, Reichenbach (DE)

(*) Notice: Subject to any disclaimer, the term of this patent is extended or adjusted under 35 U.S.C. 154(b) by 326 days.

(21) Appl. No.: 12/269,530

(22) Filed: Nov. 12, 2008

(65) Prior Publication Data

US 2009/0317200 A1    Dec. 24, 2009

(30) Foreign Application Priority Data

Jun. 19, 2008 (DE) ................ 20 2008 008 561 U

(51) Int. Cl.
*B23B 47/34* (2006.01)
(52) U.S. Cl. .......................... 408/67; 408/76
(58) Field of Classification Search ............ 408/67, 408/76; 409/137; *B23B 45/14, 47/34*
See application file for complete search history.

(56) References Cited

U.S. PATENT DOCUMENTS

| 994,430 | A | * | 6/1911 | Tunks ........................... 408/56 |
|---|---|---|---|---|
| 5,605,421 | A | * | 2/1997 | Hodgson ....................... 408/67 |
| 5,660,240 | A | * | 8/1997 | Harms et al. ................. 175/209 |
| 5,987,698 | A | * | 11/1999 | Koenig et al. ................. 15/339 |
| 6,145,162 | A | | 11/2000 | Deutschenbaur et al. |
| 7,195,429 | B2 | * | 3/2007 | Dods et al. ..................... 408/67 |
| 7,396,193 | B2 | * | 7/2008 | Kesten .......................... 408/67 |

FOREIGN PATENT DOCUMENTS

| EP | 456598 A2 | * | 11/1991 |
|---|---|---|---|
| EP | 0681889 A1 | | 11/1995 |
| EP | 0799674 A1 | | 10/1997 |
| EP | 1894653 A1 | | 3/2008 |
| GB | 2005403 A | | 4/1979 |
| GB | 2262159 A | * | 6/1993 |
| GB | 2366224 A | * | 3/2002 |
| JP | 61028418 A | * | 2/1986 |
| JP | 10015717 A | * | 1/1998 |

* cited by examiner

*Primary Examiner* — Daniel Howell
(74) *Attorney, Agent, or Firm* — Gudrun E. Huckett

(57) ABSTRACT

A device for removing drill dust when drilling a hole into a wall has a base member and at least one vacuum chamber provided in the base member. At least one suction site is provided. A connector is connected to the base member and adapted to connect a vacuum unit that removes by suction at the suction site the drill dust produced by drilling. The at least one suction site and the at least one vacuum chamber are spatially separated from one another.

14 Claims, 1 Drawing Sheet

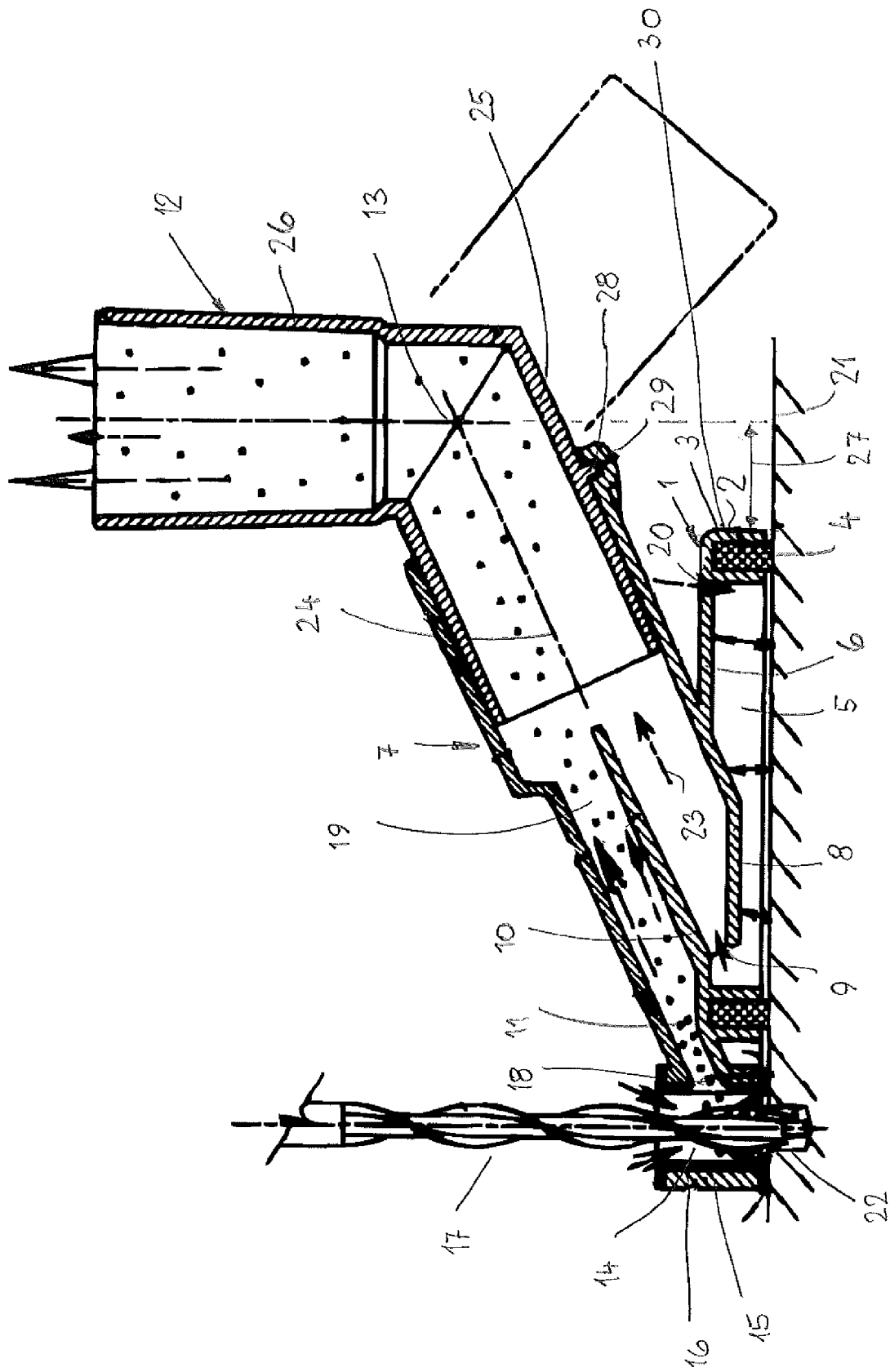

DEVICE FOR REMOVING BY SUCTION DRILL DUST WHEN DRILLING HOLES INTO WALLS

BACKGROUND OF THE INVENTION

The invention relates to a device for removing by suction drill dust when drilling holes into walls and the like, wherein the device comprises at least one vacuum chamber, at least one suction site and a connector for a vacuum unit that removes by suction at the suction site the drill dust produced by drilling.

Such removal devices serve the purpose of removing by suction (i.e., by vacuuming) drill dust that is produced when drilling a hole into a wall at the drilling location so that the drill dust does not fall onto the ground. For this purpose, the device is connected to a vacuum hose of a vacuum cleaner so that the drill dust is removed from the drilling location. In this connection, a vacuum or underpressure is produced in the vacuum chamber and the vacuum ensures that the device is pulled tightly against the wall. The device therefore must not be held by hand during the drilling operation. The drill is inserted through an opening in the chamber wall of the vacuum chamber. The drill dust that is produced when drilling is swirled in the vacuum chamber. This causes the wall area surrounding the drilling location to take on the color of the wall material that is being drilled so that after drilling and removing of the device there remains a stain on the wall about the drilling location.

Devices are also known that have an integrated pump that is actuated by means of a battery pack. In order to receive the drill dust produced when drilling, this device is provided with a collecting chamber for collecting the drill dust. The collecting chamber is open so as to allow passage of the drill bit. The removal of the drill dust is however only effective to a satisfactory extent when the collecting chamber is located within the dropping area of the drill dust produced when drilling. This is the case when drilling is done on a vertical wall and the collecting chamber is arranged underneath the drilling location. In this case, the drill dust can drop downwardly into the collecting chamber. However, often it is necessary to drill a hole into the ceiling or an area close to the floor. In this case, the drill dust reaches the collecting chamber only to an unsatisfactory extent. Moreover, the volume or size of the collecting chamber is usually minimal.

SUMMARY OF THE INVENTION

It is an object of the present invention to design the removal device of the aforementioned kind in such a way that the drill dust that is being produced can be reliably removed by suction without affecting the surface of the wall where drilling is performed and independent of the position of the removal device during the drilling operation.

In accordance with the present invention, this is achieved in that the suction site and the vacuum chamber are spatially separated from one another.

In the device according to the invention, the suction site where the drill is drilling and the vacuum chamber are spaced apart from one another or spatially separated. In this way, it is prevented that the drill dust can reach the vacuum chamber and that it produces in this area a stain on the wall.

Advantageously, the guide bushing is received in a suction sleeve. It is advantageous in this connection that with a suction sleeve and guide bushing a great diameter range of drill bits can be covered, for example, a diameter range of 6 mm to 16 mm or 12 mm to 20 mm.

In order to be able to remove the drill dust reliably, the vacuum connection is in the form of a connecting socket that adjoins the suction sleeve. The vacuum hose of a vacuum unit (e.g. vacuum cleaner) can be connected to the connecting socket so that the drill dust is removed immediately from the suction site. In this way, even large quantities of drill dust can be removed without problem.

In order for the device not to impair or hinder the operator of the drill during the drilling process, the connecting socket extends advantageously at an acute angle relative to the axis of the suction sleeve.

The guide bushing and the suction sleeve are advantageously connected to the connecting socket by means of a through opening so as to be in fluid communication. In this way, the drill dust can be removed by suction from the suction site and can be carried away through the connecting socket.

In order for the drill dust produced during drilling to be reliably removed from a circumferential area as large as possible, the through opening extends advantageously in the circumferential direction of the guide bushing and the suction sleeve. The through opening thus has a contour that deviates from a circular shape.

Advantageously, at least one opening opens into the vacuum chamber and connects the vacuum chamber to the connecting socket in fluid communication. Advantageously, in the chamber wall of the vacuum chamber there is at least one relief opening. By means of the two openings, the vacuum unit, preferably a vacuum cleaner, can produce a flow that flows in the removal direction of the connecting socket. By means of this forced flow it is ensured that drill dust removed through the connecting socket cannot fall through the opening back into the vacuum chamber.

Advantageously, the opening that connects fluidically the vacuum chamber to the connecting socket is separated by a partition from a vacuum passage in the connecting socket. This partition, together with the forced flow, ensures reliably that no drill dust from the connecting socket will pass through the opening into the vacuum chamber. In this way, it is also possible without problems to connect the removal device according to the invention to a vertical wall. The suction flow as well as the forced flow ensure even in this position of the device that the drill dust is removed properly and does not pass through the opening into the vacuum chamber.

In order to be able to connect the vacuum unit, in particular a vacuum cleaner, in a simple way to the device, a coupling member is insertable into the connecting socket for connecting a vacuum hose. The coupling member can also be designed such that it is pushed onto the connecting socket, i.e., surrounds it externally. In this way, the device according to the invention can be connected without great expenditure to a vacuuming device.

In order to enable a problem-free connection of the vacuuming hose in any position to the device according to the invention, the coupling member is advantageously configured as an angle member.

It is advantageous in this connection when the angle member is rotatable in the connecting socket. In this way, the part of the angle member that projects from the connecting socket can be adjusted into a favorable position for working.

In order for the load acting on the device by the connected vacuum hose to be as minimal as possible, the spacing of the intersection of the axes of the angularly positioned parts of the coupling member from the rear neighboring end of the device, viewed in a plan view onto the device, is minimal and is preferably zero. The projecting part generates a lever arm that as a result of this configuration is small so that onto the device in operation only a minimal force is acting. In this way it is prevented that the force acting on the device is greater than the vacuum-caused pressure forcing the device against the wall.

When the chamber wall that delimits the vacuum chamber, the suction sleeve, and the connecting socket are produced together as a monolithic part, the connecting device can be produced inexpensively and can be handled easily.

BRIEF DESCRIPTION OF THE DRAWING

The only FIGURE shows in section the drill dust removal device in accordance with the present invention.

DESCRIPTION OF THE PREFERRED EMBODIMENTS

The removal device is used in order to remove by suction the drill dust produced when drilling a hole directly at the drilling location. The device has a base member 1 that can have any contour. About a portion of its circumference, the device has a rim 2 that is rectangularly angled and in which a recess 3 for receiving a seal 4 is provided. The seal 4 projects past the rim 2 and surrounds the vacuum chamber 5 which is delimited circumferentially by the rim 2 with seal 4 and by a cover part 6 of the base member 1. A tubular connecting socket 7 projects into the vacuum chamber 5 and is advantageously embodied monolithically together with the base member 1. The connecting socket 7 projects with most of its length past the base member 1. It projects with its end area 8 slightly into the vacuum chamber 5. The end area 8 has an opening 9 by means of which the vacuum chamber 5 is connected to the interior of the connecting socket 7.

A partition 10 is provided in the connecting socket 7 and extends approximately at half the cross-sectional width of the connecting socket 7 in the longitudinal direction of the connecting socket 7. By means of this partition 10 it is prevented that the drill dust 11 produced when drilling passes through the opening 9 into the vacuum chamber 5. Accordingly, the partition 10 has such length that the vacuumed drill dust 11 is reliably sucked into the angle member 12 inserted into the connecting socket 7.

The vacuum chamber 5 is separated fluidically from the suction site (removal chamber) 14. The removal chamber 14 has advantageously a circular cross-section and is delimited circumferentially by the guide bushing 15; the guide bushing 15 is inserted into the suction sleeve 16. The suction sleeve 16 advantageously forms a monolithic part of the base member 1 and projects past an exterior side of the base member 1. The suction sleeve 16 can also be attached in an exchangeable way on the base member 1. The inner diameter of the guide bushing 15 is matched to the thickness of the drill bit 17 to be inserted. It is possible to use for different drill bit diameters different removal devices. It is advantageous to design the inner cross-section of the guide bushing 15 such that it can be used for a great range of diameters of drill bits. In this case, only one device for different drill bit diameters is required. It is also possible to provide on the base member 1 further suction sleeves with guide bushings that are provided for drill bits of different size or range.

The suction sleeve 16 is comprised advantageously of metal, in particular of steel, so that it has high wear resistance in regard to the drill dust that is being produced. The suction sleeve 16 and the guide bushing 15 each are provided with a through opening 18 by means of which the removal chamber 14 fluidically communicates with the vacuum passage 19 in the connecting socket 7

In the cover part 6 of the base member 1 at least one opening 20 is provided whose cross-section is only so large that an air stream, indicated by an arrow, can pass into the vacuum chamber 5. Since the vacuum chamber 5 is connected by opening 9 to the vacuum passage 19, upon suction removal of the drill dust 11 an air stream is generated in the vacuum chamber 5 by means of which ambient air can enter through the small opening 20. The cross-section of the opening 20 is so small that the vacuum in the vacuum chamber 5 upon suction removal of the drill dust 11 is at anytime so high that the removal device is pulled by the vacuum tightly against the wall 21 into which a hole 22 is to be drilled by the drill bit 17. By means of the minimal air stream from the opening 20 in the vacuum chamber 5 through the opening 9 and through the connecting socket 7 it is prevented that the drill dust 11 partially passes through the opening 9 into vacuum chamber 5. The flow 23 produced downstream of the opening 9 in the connecting socket 7 is so strong that the drill dust 11 sucked in through the opening 18 does not drop down behind the partition toward the opening 9 but is removed by suction properly through the angle member 12. Drill dust 11 that may fall down behind the partition 10 is then entrained by the flow 23.

Since the vacuum chamber 5 is spatially separated from the removal chamber 14, there is no danger that the drill dust 11 will deposit on the wall 21 and form a stain. The drill dust is instead completely sucked away through the connecting socket 7 and the angle member 12.

By means of the vacuum unit it is also possible to perform a drilling operation with the suction sleeve 16 pointing downwardly without there being the risk that the produced drill dust 11 will drop-down into the vacuum chamber 5. The drill dust 11 is removed through the opening 18 into the connecting socket 7 and from there into the angle member 12.

The leakage bore 20 is advantageously provided in order to generate the additional air flow 23. However, the leakage bore or opening 20 is not a necessity and can be omitted, in particular when the removal device is used on horizontal walls. But also when working on an upright wall no drill dust 11 will generally reach the vacuum chamber 5 because the partition 10 is long enough in the removal direction of the drill dust 11.

The angle member 12 in operation can be adjusted continuously about the axis 24 of the plug attachment 25 inserted into the connecting socket 7. Depending on the position of the removal device on the wall 21, the angle member 12 can be adjusted by rotation about the axis 24 such that the part 26 of the angle member 12 positioned outside of the connecting socket 7 will always point downwardly. In the drawing two different positions of the angle member 12 relative to the connecting socket 7 are shown.

The angle member 12 is designed in such a way and provided on the removal device in such a way that the spacing 27 between the intersection 13 of the axes of the parts 25, 26 of the angle member 12 and the rear rim 30 of the base member 1, viewed in plan view onto the removal device, is as minimal as possible. By means of this spacing 27, when the removal device is in use, a lever arm is generated that produces a leverage force acting on the base member 1. Since the vacuum hose (not illustrated) of the vacuum cleaner is connected to the angle member 12, by means of the lever arm 27 the weight of the angle member 12 and of the vacuum hose is acting on the base member 1. The base member 1 is therefore loaded in the position illustrated in the drawing in the clockwise direction, i.e., by the force of the lever arm 27 a force is produce that acts opposite to the vacuum of the vacuum chamber 5 and attempts to lift the removal device off the wall 21. Since the lever arm 27 is however minimal, the force that is acting opposite to the vacuum force is so small that there is no risk that the vacuum unit is lifted off the wall 21.

The angle member 12 has in the area of its plug attachment 25 a positive locking part 28 that interacts with a matching positive locking counter part 29 on the connecting socket 7. The positive looking connection is designed such that the angle member 12 can be removed from the connecting socket 7 or inserted into it only in a certain position relative to the connecting socket 7. In the illustrated embodiment the positive looking connection 28, 29 is designed such that the angle member 12 can be removed only in the position indicated in dash-dotted lines from the connecting socket 7.

The through opening 18 extends advantageously in the circumferential direction of the wall of the guide bushing 15 and of the suction sleeve 16. In this way, the drill dust 11 produced during drilling is reliably removed about the large circumferential area and reaches the connecting socket 7. The size of the intake cross-section of the through opening 18 is selected such that the flow velocity generated in the through opening 18 is so high that the drill dust 11 produced at the drilling location 22 can be properly removed by suction. In this way, it is primarily prevented that the drill dust 11 remains in the area of the drilling location 22 where it can cause problems during drilling. The through opening 18 is moreover so large that the vacuum produced in the vacuum chamber 5 as a result of the vacuum action is sufficiently high. The vacuum cleaner will remove the air in the connecting socket 7 and in the angle member 12 as well as the drill dust 11 contained therein, by means of opening 9 also the air in the vacuum chamber 5 is removed by suction so that the removal device is reliably pulled against the wall 21.

The removal device is characterized by a compact size. The cover part 6 of the base member 1 is advantageously planar (flat) so that the base member has only a minimal height. The vacuum chamber 5 must not have a large cross-sectional area in order to generate a satisfactory holding force. For example, the cross-sectional surface area of the vacuum chamber 5 can be e.g. only 50 mm by 80 mm. This minimal cross-sectional surface area is sufficient to produce a holding force that is so high that the weight acting by means of the angle member 12 and the connected vacuum hose is not sufficient to pull off the removal device from the wall 12, in particular from the ceiling. The fact that the lever arm 27 is only small contributes also advantageously to this.

The guide bushing 15 is advantageously exchangeably arranged in the suction sleeve 16 so that differently sized guide bushings 15 for different drill bit diameters can be used. The suction sleeve 16, the base member 1, and the connecting socket 7 are advantageously produced as a monolithic part of plastic material. In this way, the removal device can be produced inexpensively in particular because expensive or complex assembly labor is not required. Only the seal 4 must be inserted into the recess 3 and secured therein in a suitable way, for example, by an adhesive. The seal 4 is comprised of soft material so that it can seal, even on a rough surfaces of the wall 21, the vacuum chamber 5 in a reliable way. In this way, the removal device is pulled even for rough wall surfaces at high vacuum against the wall 21 so that it is possible to work on horizontal walls, in particular, on the ceiling as well as on upright walls without any problems. For removal of the drill dust 11, any conventional vacuum cleaner is suitable that has a sufficiently high vacuum, for example, approximately 200 mbar, and a satisfactorily high air throughput of approximately 25 l/s. With a conventional vacuum cleaner, an underpressure or vacuum of 150 mbar in the vacuum chamber 5 and a removal speed at the drill bit 17 of more than 20 m/s can be produced, for example.

The contour of the vacuum chamber 5 can be of any shape, for example, a rectangular or a triangular shape.

The specification incorporates by reference the entire disclosure of German priority document 20 2008 008 561.6 having a filing date of Jun. 19, 2008.

While specific embodiments of the invention have been shown and described in detail to illustrate the inventive principles, it will be understood that the invention may be embodied otherwise without departing from such principles.

What is claimed is:

1. A device for removing drill dust when drilling a hole into a wall, wherein the device comprises:
   a base member;
   at least one vacuum chamber provided in the base member;
   at least one suction site;
   a connecting socket connected to the base member and adapted to connect a vacuum unit that removes by suction at the suction site the drill dust produced by drilling;
   wherein the at least one suction site and the at least one vacuum chamber are spatially separated from one another;
   wherein the at least one vacuum chamber has at least one opening connecting fluidically the at least one vacuum chamber to the connecting socket;
   wherein the connecting socket has a partition dividing the connecting socket and defining a vacuum passage in which drill dust is conveyed, wherein the partition separates the at least one opening from the vacuum passage;
   wherein the at least one vacuum chamber has a chamber wall provided with at least one relief opening connecting the vacuum chamber to the ambient;
   a guide bushing for a drill bit, wherein the at least one suction site is delimited by the guide bushing.

2. The device according to claim 1, further comprising a suction sleeve, wherein the guide bushing is inserted into the suction sleeve.

3. The device according to claim 2, wherein the guide bushing is fixedly secured in the suction sleeve.

4. The device according to claim 2, wherein the suction sleeve and the guide bushing are exchangeable for accommodating differently sized drill bits.

5. The device according to claim 2, wherein the connecting socket adjoins the suction sleeve.

6. The device according to claim 5, wherein the connecting socket is positioned at an acute angle relative to an axis of the suction sleeve.

7. The device according to claim 5, wherein the guide bushing and the suction sleeve have a through opening connecting the suction site with the connecting socket.

8. The device according to claim 7, wherein the through opening extends in a circumferential direction of the guide bushing and the suction sleeve.

9. The device according to claim 5, further comprising a coupling member connected to the connecting socket.

10. The device according to claim 9, wherein the coupling member is an angle member.

11. The device according to claim 10, wherein the angle member is rotatably arranged in the connecting socket.

12. The device according to claim 9, wherein the angle member has a first part and a second part and wherein axes of the first and second parts intersect at a point of intersection, wherein the point of intersection is spaced, when viewed in a plan view onto the device, from a rearward end of the base member located opposite the suction site.

13. The device according to claim 9, wherein the angle member has a first part and a second part and wherein axes of the first and second parts intersect at a point of intersection, wherein the point of intersection has no spacing, when viewed in a plan view onto the device, relative to a rearward end of the base member located opposite the suction site.

14. The device according to claim 5, wherein a wall of the a least one vacuum chamber, the suction sleeve, and the connecting socket together form a monolithic part.

\* \* \* \* \*